United States Patent [19]

Eschwey et al.

[11] 4,171,293
[45] Oct. 16, 1979

[54] AQUEOUS DISPERSIONS OF ALKYD AND/OR AMINO RESINS CONTAINING AMINE OXIDES

[75] Inventors: Helmut Eschwey, Odenthal; Wolf-Dieter Willmund, Düsseldorf; Wolfgang Gress, Wuppertal-Elberfeld, all of Fed. Rep. of Germany

[73] Assignee: Henkel Kommanditgsellschaft auf Aktien, Düsseldorf-Holthausen, Fed. Rep. of Germany

[21] Appl. No.: 886,546

[22] Filed: Mar. 14, 1978

[30] Foreign Application Priority Data

Mar. 14, 1977 [DE] Fed. Rep. of Germany ....... 2711000

[51] Int. Cl.$^2$ .................... C09D 3/50; C09D 3/52; C09D 3/64; C09D 3/66
[52] U.S. Cl. .................... 260/22 A; 260/21; 260/22 CQ; 260/29.2 N; 260/29.2 E; 260/29.4 R; 427/374 R; 427/384; 428/430; 428/436
[58] Field of Search .............. 260/22 A, 22 CQ, 21, 260/29.4 R, 29.2 N, 29.2 E; 427/374 R, 384; 428/430, 436

[56] References Cited

U.S. PATENT DOCUMENTS

| | | | |
|---|---|---|---|
| 3,437,615 | 4/1969 | Hanson | 260/29.2 E |
| 3,474,060 | 10/1969 | Dhein et al. | 260/29.4 R |
| 4,040,995 | 8/1977 | Sekmakas et al. | 260/22 CQ |
| 4,069,183 | 1/1978 | Daimer | 260/29.2 N |

FOREIGN PATENT DOCUMENTS 1040828 9/1966 United Kingdom .................. 260/22 A Primary Examiner—Ronald W. Griffin
Attorney, Agent, or Firm—Hammond & Littell

[57] ABSTRACT

Aqueous dispersions of cross-linkable alkyd and/or amino resins, which contain surface active amine oxides of the formula

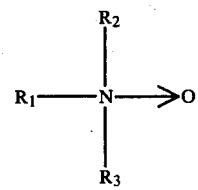

wherein $R_1$ is a hydrocarbon radical of 8 to 30 carbon atoms, which optionally contains 1 to 3 ether groups and/or up to 4 hydroxyl groups and $R_2$ and $R_3$ are independently an aliphatic or cycloaliphatic hydrocarbon radical of 1 to 16 carbon atoms, which optionally are interrupted by heteroatoms and/or together contain up to 8 hydroxyl groups, are useful as coating agents or varnish binding agents.

15 Claims, No Drawings

AQUEOUS DISPERSIONS OF ALKYD AND/OR AMINO RESINS CONTAINING AMINE OXIDES

FIELD OF THE INVENTION

The present invention relates to aqueous dispersion of resins suitable as coating agents or varnish binding agents, which can be converted by a heat treatment into the cross-linked state and are distinguished by advantageous physical and chemical properties.

BACKGROUND OF THE INVENTION

It is known to use alkyd resins having high acid numbers for the production of varnish binding agents, which have good water solubility in the form of their amine salts. The disadvantages of systems of this kind, apart from their unsatisfactory waterproofness, are to be seen, in the majority of cases, in their considerable content of volatile amines and in some cases of toxic auxiliary solvents. When the varnish layer is baked, these substances must be trapped by means of suitable absorption systems.

It is further known to modify the varnish binding materials by the incorporation of hydrophilic chains, particularly polyethylene glycol chains, in such a manner that self-emulsifying alkyd resins or melamine resins result. Furthermore, even without incorporation in the resin molecule, it is possible to use polyglycol ether derivatives, such as the adducts of ethylene oxide to fatty alcohols, as low molecular weight, non-ionic emulsifiers. In both cases, however, the hydrophilic radical remains active in the baked varnish layer and, due to its hydrophilic nature, gives rise to a susceptibility to penetration by water. In addition, a marked reduction in film hardness also often occurs.

OBJECTS OF THE INVENTION

An object of the present invention is the development of aqueous varnish systems which are superior to the known prior art systems, especially in yielding coatings which have vastly improved resistance to water penetration and superior film hardness.

Another object of the present invention is the development of aqueous varnish systems which can be used to coat the most varied materials such as glass, metals, etc. and which do not require a large volume of volatile organic solvents.

A further object of the present invention is the development of an aqueous dispersion which contains cross-linkable alkyd resins and/or amino resins and surface active substances containing an amine oxide group in the molecule.

A still further object of the present invention is to provide an aqueous dispersion of resins suitable as a coating agent or varnish binding agent comprising still cross-linkable alkyd resins and/or amino resins and surface-active amine oxides of the formula

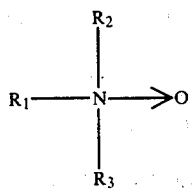

wherein $R_1$ is a hydrocarbon radical of 8 to 30 carbon atoms, which optionally contains 1 to 3 ether groups and/or up to 4 hydroxyl groups and $R_2$ and $R_3$ are independently an aliphatic or cycloaliphatic hydrocarbon radical of 1 to 16 carbon atoms, which optionally are interrupted by heteroatoms and/or together contain up to 8 hydroxyl groups.

These and other objects of the present invention will become more apparent as the description thereof proceeds.

DESCRIPTION OF THE INVENTION

The above objects have been achieved by the development of aqueous dispersions comprising a content of still cross-linkable alkyd resins and/or amino resins and of surface active substances containing an amine oxide group in the molecule. The amine oxide compounds can advantageously contain hydrocarbon radicals which are optionally substituted by hydroxyl groups and/or contain a heteroatom or heteroatoms in the hydrocarbon chain. Amine oxide compounds of this type decompose at temperatures between 80° and 200° C. into non-emulsifying fragments which in certain cases react with the binding agent by means of additional functional hydroxyl groups, whereby they can be chemically incorporated into the varnish layer.

In a preferred embodiment the aqueous dispersions of the invention contain amine oxides of the formula

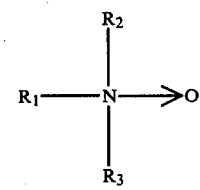

wherein $R_1$ is a hydrocarbon radical having 8 to 30, preferably 8 to 18, carbon atoms, which is selected from the group consisting of an aliphatic radical, a cycloaliphatic radical, and an aliphatic or cycloaliphatic radical which is substituted by a member selected from the group consisting of 1 to 3 ether groups, 1 to 4 hydroxyl groups, and mixtures thereof, and $R_2$ and $R_3$ are independently a hydrocarbon radical having 1 to 16, preferably 1 to 10, carbon atoms, which is selected from the group consisting of an aliphatic radical, a cycloaliphatic radical and an aliphatic or cycloaliphatic radical which is substituted by a member selected from the group consisting of 1 to 3 heteroatoms, preferably oxygen atoms, 1 to 4 hydroxyl groups, and mixtures thereof.

Suitable amine oxides of the invention are, for example, dimethylhexadecylamine oxide, alkyl-($C_{12}$–$C_{18}$)-di-(2,3-dihydroxypropyl)-amine oxide, alkyl-($C_8$,$C_{10}$,$C_{12}$,$C_{14}$)-dihydroxypropyl-amine oxide, N-(tetraethylene glycol ether) of 2-hydroxyalkyl-amine oxide, wherein the alkyl group represents a straight-chain $C_{12}$ or $C_{14}$ radical, N,N-bis(hydroxyethoxyethyl)ether-2-hydroxyalkyl-amine oxide, wherein the alkyl is a mixture of dodecyl and tetradecyl. Numerous other variations in structure are, of course, possible under the above general formula of the amine oxides, which can be prepared by methods well-known in the art. The aliphatic hydrocarbon radicals of the amine oxides of the invention are most suitably alkyl radicals having in the case of $R_1$ 8 to 30, preferably 8 to 18, carbon atoms and in the case of $R_2$ and $R_3$ 1 to 16, preferably 1 to 10, carbon atoms. Said alkyl radicals are preferably substituted by up to 4 hydroxyl groups in the case of $R_1$ and up to a total of 8 hydroxyl groups for $R_2$ and $R_3$ combined. The cycloaliphatic hydrocarbon radicals of the amine oxides are preferably cycloalkyl radicals having 3 to 12, preferably 5 to 8, most preferably 6, carbon atoms. Those $R_1$, $R_2$ and $R_3$ hydrocarbon radicals which are substituted or interrupted by heteroatoms are preferably oxaalkyl or oxacycloalkyl radicals containing 1 to 3 ether linkages along the hydrocarbon chain. Especially suitable are the oxaalkyl radicals.

Among the above-mentioned amine oxides of the invention, those are particularly suitable wherein the $R_1$ radical is an aliphatic or cycloaliphatic, especially an aliphatic, radical which contains 1 to 3 hydroxyl groups and 8 to 18 carbon atoms. These aliphatic and cycloaliphatic hydrocarbon radicals are preferably alkyl and cycloalkyl radicals, respectively. These preferred amine oxides most suitably contain in toto no more than 2 to 6 hydroxyl groups in the molecule, i.e. including those on the $R_2$ and $R_3$ radicals as well as those on the $R_1$ radical.

Those amine oxides of the invention have been found particularly suitable wherein $R_1$ is alkyl or hydroxyalkyl of 8 to 18 carbon atoms, and $R_2$ and $R_3$ are (i) lower alkyl, (ii) hydroxy lower alkyl, preferably hydroxy lower alkyl of 2 or 3 carbon atoms, or (iii) polyalkylene glycol ether radicals, preferably polyethylene glycol ether radicals, which advantageously contain 1 to 3 ether linkages along the hydrocarbon chain such as hydroxyethoxyethyl.

The amine oxide emulsifiers of the invention are advantageously used in a quantity of approximately 0.5 to 10, preferably 2 to 8, percent by weight, relative to the total resin constituent. In choosing the quantity of amine oxide to be used, its content of free hydroxyl groups should be matched to those groups, capable of reacting with said hydroxyl groups, which are present in the cross-linkable resin component of the aqueous dispersions. This determination of the quantity of amine oxide to be used in the aqueous dispersions of the invention is made more in accordance with empirical considerations than from a purely stoichiometric calculation. One skilled in the art can readily determine the desirable amount of amine oxide to be added by routine experimentation.

As the coating or varnish binding agent of the invention, those cross-linkable alkyd resins can be used which cannot be converted by amine neutralization into a water soluble or dilutable form and are thus such as are normally applied in organic solvents. These alkyd resins suitably have an acid number of about 5 to 40, preferably from 10 to 25. Their fatty acid content should be between about 20 and 45 weight percent, relative to the solid resin. As the cross-linkable aminoplast resin component of the invention, those known preliminary resin condensates can be used which are also used in a conventional manner in systems containing a solvent, as, for example, the alkyl ethers of hexamethylol melamine. Examples of such ethers of hexamethylol melamine are hexamethyl ether and the hexabutyl ether. Particularly favorable results are obtained when the alkyd resins and aminoplast resins are combined with each other. In practice resin combinations of 45 to 85%, more particularly 60 to 85%, by weight of alkyd resin with 55 to 15%, more particularly 40 to 15%, by weight of aminoplast resin have proved quite effective. In general, the total amount of resin used is such that the aqueous dispersion of the invention has a resin solids content of about 30 to 70% by weight.

Thus, more particularly, the aqueous dispersions of the invention are comprised of (a) from 30 to 70% by weight, based on the total weight of the aqueous dispersion, of a cross-linkable resin selected from the group consisting of alkyd resins, aminoplast resins and mixtures thereof, (b) from 0.5 to 10% by weight, based on the weight of the resins, of an amine oxide of the formula

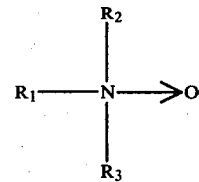

wherein $R_1$ is a hydrocarbon radical having 8 to 30, preferably 8 to 18, carbon atoms, which is selected from the group consisting of an aliphatic radical, a cycloaliphatic radical, and an aliphatic or cycloaliphatic radical which is optionally substituted by a member selected from the group consisting of 1 to 3 ether groups, 1 to 4 hydroxyl groups, and mixtures thereof, and $R_2$ and $R_3$ are independently a hydrocarbon radical having 1 to 16, preferably 1 to 10, carbon atoms, which is selected from the group consisting of an aliphatic radical, a cycloaliphatic radical and an aliphatic or cycloaliphatic radical which is optionally substituted by a member selected from the group consisting of 1 to 3 heteroatoms, preferably oxygen atoms, 1 to 4 hydroxyl groups, and mixtures thereof, and (c) the remainder the aqueous liquid phase of the dispersion.

The production of the dispersions is effected in accordance with conventional dispersing or emulsifying methods at temperatures between about 20° C. and 100° C., and optionally under pressure at temperatures above 100° C. Water-miscible or at least partly water-soluble organic solvents, such as ethylene glycol monobutyl ether, phenyl ether, lower alcohols, e.g. butanol and the like can be used in minor amounts in the aqueous liquid phase. Since these organic solvents serve, in the first instance, as processing aids they are used in a proportion which does not exceed 15% by weight, more particularly 10% by weight, relative to the total weight of the prepared aqueous dispersion. It can furthermore be advantageous to add to the dispersions small amounts of basic nitrogen compounds, such as tertiary or secondary aliphatic amines, among which may be mentioned dimethylethanolamine, triethanolamine, butyldiethanolamine, butylethylamine and the like. These compounds should not exceed a quantity of 2% by weight, relative to the total weight of the prepared aqueous dispersion.

The dispersions in accordance with the invention may comprise oil-in-water emulsions, which can be diluted to an unlimited extent with water. In contrast to the numerous known water dilutable, amine neutralized alkyd resin systems the dispersions in accordance with the invention show, even in the absence of auxiliary organic solvents, no maximum in the dilution curve, i.e. no viscosity anomaly (see e.g. E. Hüttmann et al., Plaste und Kautschuk [Plastics and Rubber] 17 (1970) 202).

The aqueous dispersions can be pigmented in accordance with conventional methods. The above-described combinations of alkyd resins with amino resins or corresponding preliminary condensates are distinguished as a varnish binding agent by their especially good properties. The baking of the varnish films, which is carried out by employing the dispersions of the invention in accordance with known methods, takes place after a pre-drying step at between about 120° C. and 180° C. in suitable drying ovens or drying ducts. The dispersions of the invention can be used to coat the most varied materials, such as glass or metals, e.g. aluminum, iron, steel and many others. The baked coatings are particularly distinguished by their improved waterproofness as well as by their great hardness. They are clearly superior with respect to their waterproofness to both the conventional emulsions based on non-reactive emulsifiers as well as the water-dilutable amine-neutralized systems. The advantages which are realized because of the extremely low content of volatile organic solvents contained in the dispersions of the invention should also be mentioned as a most important feature of the invention.

The present invention will now be further described by means of the following examples, which are not to be deemed limitative in any manner.

EXAMPLES

The following alkyd resins designated I to III and amino resins designated IV and V were used for the production of the dispersions in accordance with the invention.

Alkyd resin I was produced from
  298 gm conjugated sunflower oil fatty acid
  379 gm phthalic anhydride
  32.6 gm benzoic acid
  346.5 gm trimethylolpropane The alkyd resin had an oil content of 32%. It was condensed to the point when the acid number was 20.

Alkyd resin II was produced from
  400 gm conjugated sunflower oil fatty acid
  380 gm phthalic anhydride
  347 gm trimethylolpropane The alkyd resin had an oil content of 38%. It was condensed to the point when the acid number was 18.

Alkyd resin III was produced from
  400 gm conjugated sunflower oil fatty acid
  340 gm phthalic anhydride
  310 gm trimethylolpropane The alkyd resin had an oil content of 42%. It was condensed to the point when the acid number was 15.

Amino resin IV consisted of a conventional commercial hexamethoxymethylmelamine.

Amino resin V consisted of a 67% solution of a conventional commercial hexamethoxymethylmelamine in ethylene glycol monobutyl ether.

The following emulsifiers were used in producing the dispersions:

Emulsifier A
  Dimethylhexadecylamine oxide
Emulsifier B
  Alkyl-di-(2,3-dihydroxypropyl) amine oxide
  (Alkyl=techn. cocoa alkyl of approximately 47% $C_{12}$, 18% $C_{14}$, 10% $C_{16}$, 13% $C_{18}$)
Emulsifier C
  2-hydroxyalkyl-di-2-hydroxyethylamine oxide
  (Alkyl=mixture of equal parts of dodecyl and tetradecyl)
Emulsifier D
  Alkyl-di-2-hydroxypropylamine oxide
  (alkyl=mixture of equal parts of dodecyl and tetradecyl)
Emulsifier E
  N,N-Bis(hydroxyethoxyethyl)-ether of 2-hydroxyalkylamine oxide
  (Alkyl=mixture of equal parts of dodecyl and tetradecyl)

The following conventional commercial emulsifiers were used for comparative tests:

Comparative emulsifier a
consisted of the addition product of 15 moles of ethylene oxide to 1 mole of nonylphenol.

Comparative emulsifier b
consisted of the addition product of 20 moles of ethylene oxide to a mixture of approximately equal parts by weight of $C_{16}$- and $C_{18}$- fatty alcohols.

A. Production of Dispersions

The alkyd resin, emulsifier, water and amine were heated to 80° C. Then they were dispersed using a high-speed agitator (10,000 rpm). After the dispersion was cooled down to approximately 25° C. the amino resin and, where necessary, the ethylene glycol monobutyl ether were worked in. The dispersions in accordance with the invention, which can be diluted with water if required, had the following compositions.

EXAMPLE 1

| | Percent by Weight |
|---|---|
| Alkyd resin I | 32.90 |
| Amino resin IV | 14.10 |
| Emulsifier A | 3.00 |
| Dimethylethanolamine | 1.00 |
| Ethylene glycol monobutyl ether | 5.00 |
| Water | 44.00 |

EXAMPLE 2

| | Percent by Weight |
|---|---|
| Alkyd resin II | 40.60 |
| Amino resin V | 26.00 |
| Emulsifier B | 2.00 |
| Dimethylethanolamine | 0.80 |
| Water | 30.60 |

EXAMPLE 3

| | Percent by Weight |
|---|---|
| Alkyd resin III | 21.60 |
| Amino resin V | 21.50 |
| Emulsifier C | 4.00 |
| Dimethylethanolamine | 1.50 |
| Ethylene glycol monobutyl ether | 5.00 |
| Water | 46.40 |

EXAMPLE 4

| | Percent by Weight |
|---|---|
| Alkyd resin I | 39.90 |
| Amino resin IV | 17.10 |
| Emulsifier D | 3.00 |
| Dimethylethanolamine | 1.00 |
| Ethylene glycol monobutyl ether | 10.00 |
| Water | 29.00 |

EXAMPLE 5

|  | Percent by Weight |
|---|---|
| Alkyd resin II | 33.80 |
| Amino resin V | 20.60 |
| Emulsifier E | 1.75 |
| Dimethylethanolamine | 0.80 |
| Water | 43.05 |

COMPARATIVE EXAMPLES

|  |  | Percent by Weight |
|---|---|---|
| (i) | Alkyd resin II | 32.75 |
|  | Amino resin IV | 22.40 |
|  | Comparative emulsifier a | 2.25 |
|  | Dimethylethanolamine | 1.50 |
|  | Ethylene glycol monobutyl ether | 5.00 |
|  | Water | 36.10 |
| (ii) | Alkyd resin II | 32.75 |
|  | Amino resin IV | 22.40 |
|  | Comparative emulsifier b | 2.25 |
|  | Dimethylethanolamine | 1.50 |
|  | Ethylene glycol monobutyl ether | 5.00 |
|  | Water | 36.10 |

B. Testing of Films from Dispersions

In order to test the films which can be produced from the above dispersions, glass plates were coated with them and baked for 30 minutes at 150° C. The thickness of the dry film was 50 $\mu$m. The hardness of the film was determined by measuring the pendulum hardness in accordance with DIN 53 157.

To determine their waterproofness, the films were dipped in distilled water at 40° C. and evaluated with regard to the formation of bubbles and any signs of peeling after 1, 5, 10, 20 and 30 hours. The evaluation was carried out in accordance with a 5-point system:
1. Film unaltered
2. Beginnings of bubble formation at the edge
3. Light bubble formation over the entire film surface
4. Strong bubble formation over the entire film surface
5. Film has peeled away from the glass backing All films were clear and shiny apart from comparative example (ii) which gave a dull to lightly cloudy film.

The following table gives the pendulum hardness and the behavior with regard to distilled water for the above examples in accordance with the above-mentioned procedures.

TABLE

| Example | Pendulum hardness (DIN 53 157) (Sec.) | WATERPROOFNESS | | | | |
|---|---|---|---|---|---|---|
|  |  | 1 hr | 5 hrs | 10 hrs | 20 hrs | 30 hrs |
| 1 | 105 | 1 | 1 | 1 | 1 | 2 |
| 2 | 115 | 1 | 1 | 1 | 1 | 1 |
| 3 | 120 | 1 | 1 | 1 | 1 | 1 |
| 4 | 130 | 1 | 1 | 1 | 1 | 1 |
| 5 | 115 | 1 | 1 | 1 | 1 | 1 |
| Comparison i | 100 | 1 | 1-2 | 2 | 4 | 4 |
| Comparison ii | 40 | 2 | 3 | 4 | 5 | 5 |

The results presented above show the clear superiority of the films prepared using the amine oxide emulsifiers of the invention over the films prepared using the comparative emulsifiers of the prior art. Whereas all films prepared in accordance with the present invention were clear and shiny, a dull to lightly cloudy film was obtained for comparative example ii. The results in the above table further demonstrate that the films of the present invention are considerably superior to those of the prior art in both pendulum hardness and waterproofness.

The preceding specific embodiments are illustrative of the practice of the invention. It is to be understood, however, that other expedients known to those skilled in the art or described herein, may be employed without departing from the spirit of the invention or the scope of the appended claims.

We claim:

1. an aqueous disperson of resins suitable as a coating agent or varnish binding agent, comprising a content of
(a) from 30% to 70% by weight, based on the total weight of the aqueous dispersion, of crosslinkable resins selected from the group consisting of alkyd resins, aminoplast resins and mixtures thereof, and
(b) from 0.5% to 10% by weight, based on the weight of said resins, of a surface-active amine oxide having the formula

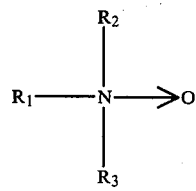

wherein $R_1$ is a hydrocarbon radical having 8 to 30 carbon atoms, which is selected from the group consisting of an aliphatic radical, a cycloaliphatic radical, and an aliphatic or cycloaliphatic radical which is substituted by a member selected from the group consisting of 1 to 3 ether groups, 1 to 4 hydroxyl groups, and mixtures thereof, and $R_2$ and $R_3$ are independently a hydrocarbon radical having 1 to 16 carbon atoms, which is selected from the group consisting of an aliphatic radical, a cycloaliphatic radical, and an aliphatic or cycloaliphatic radical which is substituted by a member selected from the group consisting of 1 to 3 heteroatoms, 1 to 4 hydroxyl groups and mixtures thereof, and
(c) an aqueous medium.

2. The aqueous dispersion of claim 1, wherein $R_1$ is a hydrocarbon radical having 8 to 18 carbon atoms, which is selected from the group consisting of alkyl, cycloalkyl, oxaalkyl having up to 3 ether groups, cyclooxaalkyl having up to 3 ether groups, hydroxyalkyl having 1 to 4 hydroxy groups, cyclohydroxyalkyl having 1 to 4 carbon atoms, hydroxy-oxaalkyl having a hydroxy group and up to 3 ether groups, and $R_2$ and $R_3$ are independently a hydrocarbon radical having 1 to 10 carbon atoms, which is selected from the group consisting of alkyl, hydroxyalkyl having 1 to 4 hydroxyl groups, oxaalkyl having up to 3 ether groups, hydroxy-oxaalkyl having a hydroxy group and up to 3 ether groups, and when taken together, alkylene having 2 to 6 carbon atoms and oxaalkylene having 4 to 8 carbon atoms and up to 3 ether groups and mixtures thereof.

3. The aqueous dispersion of claim 1, wherein the amine oxide contains from 1 to 6 hydroxyl groups in the molecule.

4. The aqueous dispersion of claim 1 wherein $R_1$ is a member selected from the group consisting of alkyl having 8 to 30 carbon atoms and hydroxyalkyl having 8 to 30 carbon atoms and 1 to 4 hydroxy groups, and $R_2$ and $R_3$ are independently a member selected from the group consisting of alkyl having 1 to 4 carbon atoms, hydroxyalkyl having 2 to 4 carbon atoms and 1 to 2 hydroxy groups and hydroxy oxaalkyl having 4 to 10 carbon atoms, and 1 to 3 ether groups.

5. The aqueous dispersion of claim 1 wherein the resin comprises 45 to 85% by weight of alkyd resin and 55 to 15% by weight of aminoplast resin.

6. The aqueous dispersion of claim 1 which contains 2 to 8% by weight, based on the weight of the resins, of said amine oxide.

7. The aqueous dispersion of claim 1 which contains 1-10% by weight, based on the total weight of the aqueous dispersion, of an at least partly water-soluble organic solvent.

8. The aqueous dispersion of claim 1 wherein the alkyd resins have an acid member of about 5 to 40 and an unsaturated fatty acid content between about 20 and 45% by weight, relative to the total weight of the solid alkyd resin.

9. The aqueous dispersion of claim 10 wherein the alkyd resins have an acid number of from 10 to 25.

10. The aqueous dispersion of claim 1 wherein the aminoplast resins are lower alkyl ethers of hexamethylolmelamine.

11. The aqueous dispersion of claim 10 wherein said lower alkyl ethers are selected from the group consisting of the hexamethyl and the hexabutyl ether.

12. The aqueous dispersion of claim 1 wherein resin is a mixture of 45 to 85% by weight of an alkyd resin having an acid number of about 5 to 40 and an unsaturated fatty acid content between about 20 and 45% by weight, relative to the total weight of the solid alkyd resin, and 55 to 15% by weight of an alkyl ether of hexamethylolmelamine.

13. The aqueous dispersion of claim 12 which contains
 (a) an amine oxide selected from the group consisting of dimethylhexadecylamine oxide, alkyl-di-(2,3-dihydroxypropyl) amine oxide (alkyl=techn. coco alkyl of approximately 47% of $C_{12}$, 18% $C_{14}$, 10% $C_{16}$, 13% $C_{18}$), 2-hydroxyalkyl-di-2-hydroxyethylamine oxide (alkyl=mixture of equal parts of dodecyl and tetradecyl), alkyl-di-2-hydroxypropylamine oxide (alkyl=mixture of equal parts of dodecyl and tetradecyl), and N,N-Bis(hydroxyethoxyethyl)- of 2 hydroxyalkylamine oxide (alkyl=mixture of equal parts of dodecyl and tetradecyl),
 (b) 0.5 to 2% by weight of a basic nitrogen compound selected from the group consisting of dimethylethanolamine, triethanolamine, butylethylamine and mixtures thereof,
 (c) the remainder an aqueous liquid phase consisting of water and 0-15% by weight, based on the total weight of the aqueous dispersion, of an at least partly water-soluble organic solvent selected from the group consisting of ethylene glycol monobutyl ether, phenyl ether, butanol and mixtures thereof.

14. A process of forming a baked coated surface comprising the steps of
 (a) applying the aqueous dispersion of claim 1 to the surface to form a coating thereon
 (b) drying and baking, with a heating means, the coated surface at about 100°-200° C.,
 (c) baking the coated surface at about 100°-200° C. by said heating means, and
 (d) removing the baked coated surface from said heating means.

15. The baked coated surface produced by the process of claim 14.

* * * * *